US010461648B2

(12) United States Patent
Xiong (10) Patent No.: US 10,461,648 B2
(45) Date of Patent: Oct. 29, 2019

(54) ALTERNATING CURRENT STEP-DOWN CIRCUIT

(71) Applicant: Shenzhen Segre Electronic Co., Ltd., Shenzhen, Guangdong Province (CN)

(72) Inventor: Wanglong Xiong, Longyan (CN)

(73) Assignee: SHENZHEN SEGRE ELECTRONIC CO., LTD., Shenzhen (CN)

( * ) Notice: Subject to any disclaimer, the term of this patent is extended or adjusted under 35 U.S.C. 154(b) by 148 days.

(21) Appl. No.: 15/687,168

(22) Filed: Aug. 25, 2017

(65) Prior Publication Data

US 2019/0028032 A1 Jan. 24, 2019

(30) Foreign Application Priority Data

Jul. 21, 2017 (CN) .......................... 2017 1 0604097

(51) Int. Cl.
| | | |
|---|---|---|
| H02M 3/335 | (2006.01) | |
| H02M 1/08 | (2006.01) | |
| H02M 7/5387 | (2007.01) | |
| H02M 5/458 | (2006.01) | |
| H02M 7/217 | (2006.01) | |
| H02M 3/156 | (2006.01) | |
| H02M 1/00 | (2006.01) | |
| H02M 1/32 | (2007.01) | |

(52) U.S. Cl.
CPC ......... *H02M 3/33523* (2013.01); *H02M 1/08* (2013.01); *H02M 3/335* (2013.01); *H02M 5/458* (2013.01); *H02M 7/53871* (2013.01); *H02M 3/156* (2013.01); *H02M 7/217* (2013.01); *H02M 2001/007* (2013.01); *H02M 2001/327* (2013.01)

(58) Field of Classification Search
CPC ........ H02M 3/335; H02M 3/337; H02M 3/00; H02M 1/08; H02M 1/5387; H02M 1/00; H02M 1/217
USPC .... 307/31, 33, 63, 64, 66, 82, 80, 9.1, 10.1, 307/43
See application file for complete search history.

(56) References Cited

U.S. PATENT DOCUMENTS

| | | | | |
|---|---|---|---|---|
| 4,860,185 A * | 8/1989 | Brewer | ..................... | G06F 1/28 363/41 |
| 5,546,331 A * | 8/1996 | Mathews | ............. | G01D 18/008 323/266 |
| 6,650,070 B1 * | 11/2003 | Hudson | ................ | H05B 39/047 315/307 |

(Continued)

*Primary Examiner* — Fritz M Fleming
*Assistant Examiner* — Jagdeep S Dhillon
(74) *Attorney, Agent, or Firm* — Withrow & Terranova, P.L.L.C.; Vincent K. Gustafson (57) ABSTRACT

An alternating current step-down circuit comprises an AC input, a DC output, an AC output, a full-bridge rectification and filtering circuit, a flyback step-down circuit, a DC-DC step-down unit and an inverting unit. The AC input is connected with an input of the full-bridge rectification and filtering circuit; an output of the full-bridge rectification and filtering circuit is connected with an input of the flyback step-down circuit and an input of the DC-DC step-down unit, respectively; an output of the flyback step-down circuit is connected with the DC output, the input of the DC-DC step-down unit and an input of the inverting unit, respectively; an output of the DC-DC step-down unit is connected with the input of the inverting unit; and an output of the inverting unit is connected with the AC output.

14 Claims, 7 Drawing Sheets

(56) References Cited

U.S. PATENT DOCUMENTS

| | | | |
|---|---|---|---|
| 2012/0307530 A1* | 12/2012 | Miyazaki | H02M 1/36 |
| | | | 363/21.01 |
| 2013/0127248 A1* | 5/2013 | Lai | H02J 9/005 |
| | | | 307/31 |
| 2014/0027089 A1* | 1/2014 | Hisada | B60L 3/003 |
| | | | 165/11.1 |
| 2015/0188448 A1* | 7/2015 | Perreault | H02M 7/217 |
| | | | 363/89 |
| 2015/0289321 A1* | 10/2015 | Uchida | H05B 6/06 |
| | | | 219/662 |
| 2017/0261892 A1* | 9/2017 | Aoki | G03G 15/205 |

* cited by examiner

ALTERNATING CURRENT STEP-DOWN CIRCUIT

CROSS-REFERENCE TO RELATED APPLICATION(S)

This application claims priority under 35 U.S.C. § 119 to Chinese Patent Application No. 201710604097.0 filed on Jul. 21, 2017.

FIELD OF THE INVENTION

The present disclosure relates to the field of alternating current step-down, and in particular to an alternating current step-down circuit.

BACKGROUND OF THE INVENTION

With the development of industry, science and technology, various electronic products and electronic equipment such as household appliances appear constantly. However, the various electronic products and household appliances require different operating voltages, some needs the direct current, while some needs the alternating current for normal operation. Moreover, the values of the operating voltages required by different electronic equipment are also different. Therefore, an alternating current step-down circuit has been developed to process the alternating current, so as to generate alternating or direct currents of different voltage values to meet the requirements of different electronic equipment, so that the alternating current step-down circuit has received considerable attention and popularity. However, the existing alternating current step-down circuits are generally large and complex, are high in design and manufacture cost, have a single function and can only provide an alternating or direct current voltage, thus leading to a poor user experience.

SUMMARY OF THE INVENTION

To solve the above technical problems, the present disclosure aims to provide an alternating current step-down circuit which is simple and has rich functions.

The technical solution adopted by the present disclosure is as follows: an alternating current step-down comprises an AC input, a DC output, an AC output, a full-bridge rectification and filtering circuit, a flyback step-down circuit, a DC-DC step-down unit and an inverting unit. The AC input is connected with an input of the full-bridge rectification and filtering circuit; an output of the full-bridge rectification and filtering circuit is connected with an input of the flyback step-down circuit and an input of the DC-DC step-down unit, respectively; an output of the flyback step-down circuit is connected with the DC output, the input of the DC-DC step-down unit and an input of the inverting unit, respectively; an output of the DC-DC step-down unit is connected with the input of the inverting unit; and an output of the inverting unit is connected with the AC output.

Further, the alternating current step-down circuit further comprises a fan circuit an input of which is connected with the output of the inverting unit.

Further, the alternating current step-down circuit further comprises a temperature detection circuit an output of which is connected with the input of the inverting unit.

Further, the alternating current step-down circuit further comprises an operative state indication circuit an input of which is connected with the output of the inverting unit.

Further, the alternating current step-down circuit further comprises a DC output voltage control circuit which is connected with the DC output.

Further, the DC-DC step-down unit comprises a first master control circuit, a DC-DC step-down circuit, a current detection circuit and a voltage feedback circuit. The output of the full-bridge rectification and filtering circuit is connected with an input of the DC-DC step-down circuit; the output of the flyback step-down circuit is connected with an input of the first master control circuit; an output of the DC-DC step-down circuit is connected with the input of the inverting unit, an input of the current detection circuit and an input of the voltage feedback circuit, respectively; an output of the current detection circuit and an output of the voltage feedback circuit are connected with the input of the first master control circuit; and an output of the first master control circuit is connected with the input of the DC-DC step-down circuit.

Further, the inverting unit comprises a current-voltage detection circuit, a second master control circuit, a DC-AC full-bridge switch circuit and a PWM control circuit. the output of the DC-DC step-down unit is connected with an input of the current-voltage detection circuit; the output of the flyback step-down circuit is connected with an input of the second master control circuit; an output of the current-voltage detection circuit is connected with the input of the second master control circuit and an input of the DC-AC full-bridge switch circuit, respectively; an output of the second master control circuit is connected with an input of the PWM control circuit; an output of the PWM control circuit is connected with the input of the DC-AC full-bridge switch circuit; and an output of the DC-AC full-bridge switch circuit is connected with the AC output.

Further, the flyback step-down circuit comprises a PWM controller chip and a peripheral circuit thereof.

Further, the first master control circuit comprises a PWM controller chip and a peripheral circuit thereof.

Further, the second master control circuit comprises a single chip microcomputer and a peripheral circuit thereof.

The present disclosure has the beneficial effects that: the alternating current step-down circuit of the present disclosure converts an AC signal into a DC signal and an AC signal through the full-bridge rectification and filtering circuit, the flyback step-down circuit, the DC-DC step-down unit and the inverting unit, which is not only simple in structure, but also realizes the conversion of the AC signal into the AC signal and DC signal, and has rich functions. Therefore, the user requirements are satisfied and the user experience is enhanced.

BRIEF DESCRIPTION OF THE DRAWINGS

Hereinafter, embodiments of the disclosure will be described below in connection with the drawings, wherein.

DETAILED DESCRIPTION OF THE EMBODIMENTS

It should be noted that the embodiments of the present application and the features of the embodiments may be combined without conflicting with each other.

Figure 1:
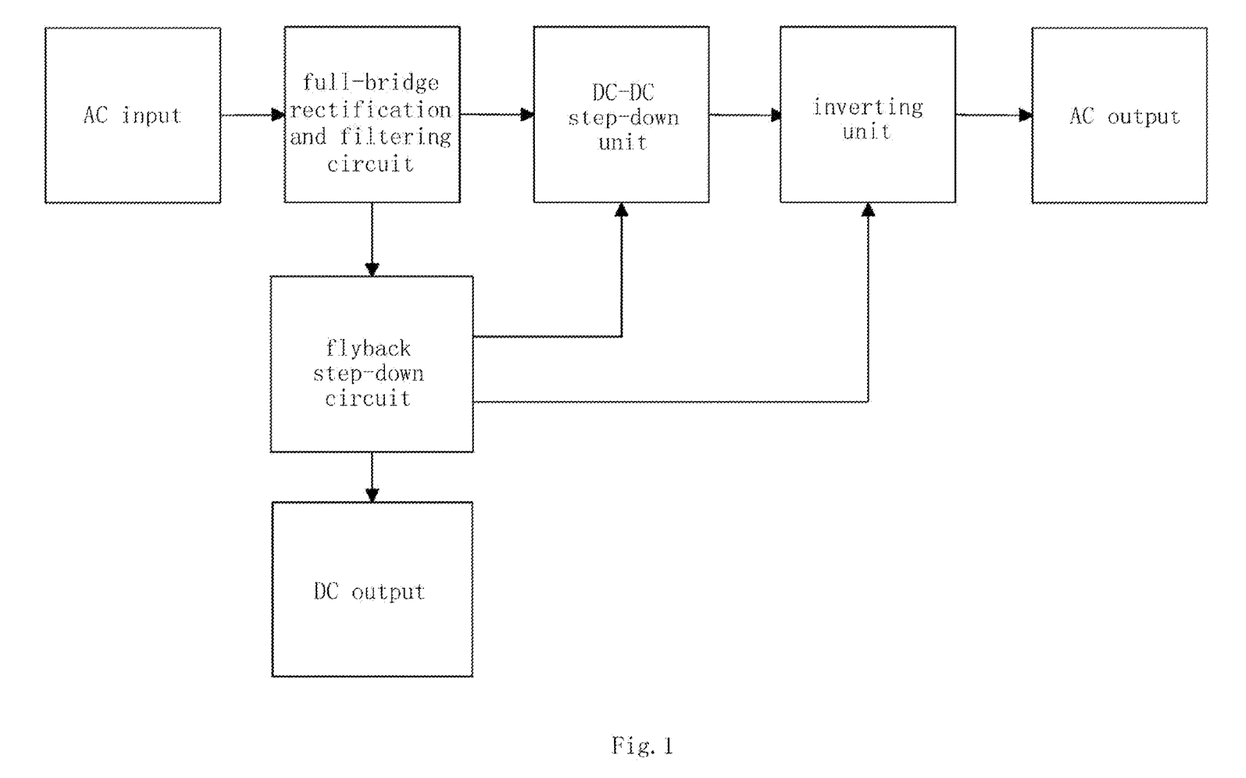
FIG. 1 is a structural block diagram of an alternating current step-down circuit of the present disclosure.

With reference to FIG. 1 showing a structural block diagram of an alternating current step-down circuit of the present disclosure, an alternating current step-down circuit comprises an AC input, a DC output, an AC output, a full-bridge rectification and filtering circuit, a flyback step-down circuit, a DC-DC step-down unit and an inverting unit. The AC input is connected with an input of the full-bridge rectification and filtering circuit; an output of the full-bridge rectification and filtering circuit is connected with an input of the flyback step-down circuit and an input of the DC-DC step-down unit, respectively; an output of the flyback step-down circuit is connected with the DC output, the input of the DC-DC step-down unit and an input of the inverting unit, respectively; an output of the DC-DC step-down unit is connected with the input of the inverting unit; and an output of the inverting unit is connected with the AC output.

The alternating current step-down circuit of the present disclosure converts an AC signal into a DC signal and an AC signal through the full-bridge rectification and filtering circuit, the flyback step-down circuit, the DC-DC step-down unit and the inverting unit, which is not only simple in structure, but also realizes the conversion of the AC signal into the AC signal and DC signal, and has rich functions. Therefore, the user requirements are satisfied and the user experience is enhanced.

Figure 2:
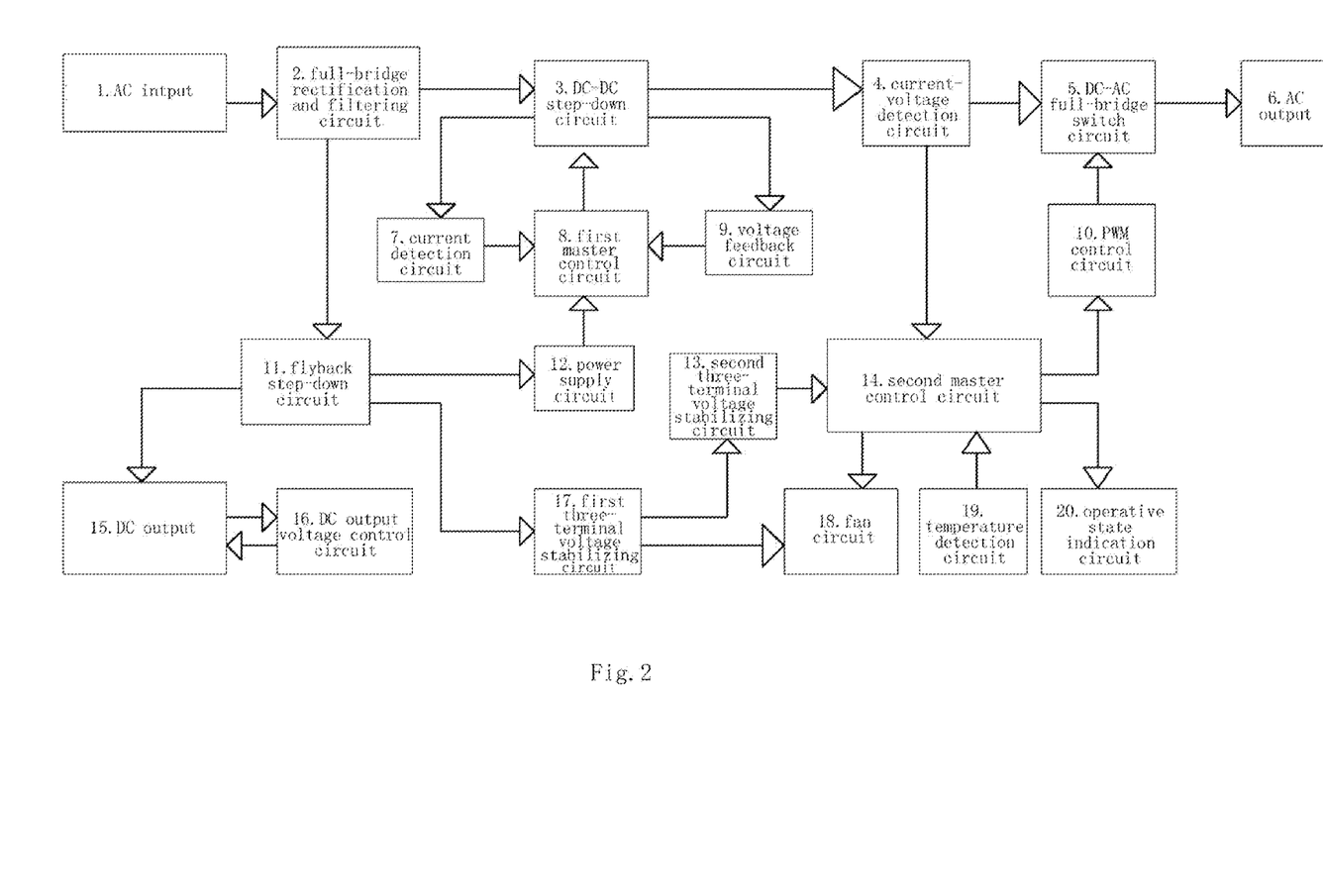
FIG. 2 is a structural block diagram of a specific embodiment of the alternating current step-down circuit of the present disclosure.
Figure 3:
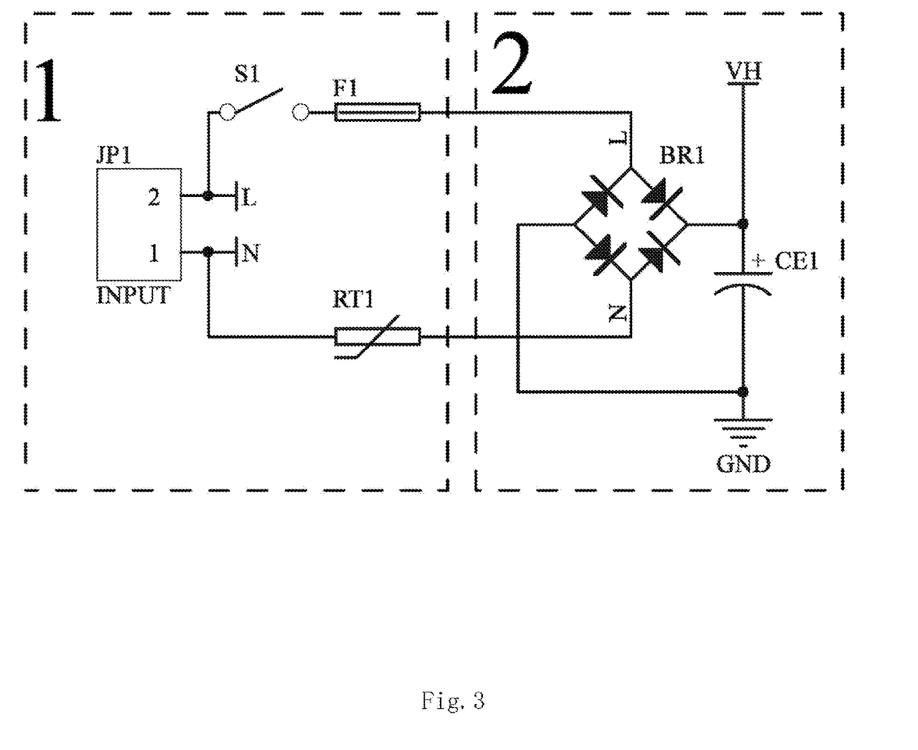
FIG. 3 is a circuit diagram of a specific embodiment of an AC input and a full-bridge rectification and filtering circuit of the alternating current step-down circuit of the present disclosure.

With reference to FIGS. 2 and 3, FIG. 2 is a structural block diagram of a specific embodiment of the alternating current step-down circuit of the present disclosure, and FIG. 3 is a circuit diagram of a specific embodiment of an AC input and a full-bridge rectification and filtering circuit of the alternating current step-down circuit of the present disclosure. An AC signal is input through the AC input JP1 into the alternating current step-down circuit for processing, and is converted by the full-bridge rectification and filtering circuit into a DC signal for further processing by subsequent circuits. Wherein, a power switch S1 intended to serve as a main switch of the alternating current step-down circuit is arranged at the AC input; and the AC input is further provided with a surge buffering circuit including a 10D-9 thermistor RT1, which may reduce the value of an instantaneous current input from the AC input, and protect the alternating current step-down circuit.

Figure 4:
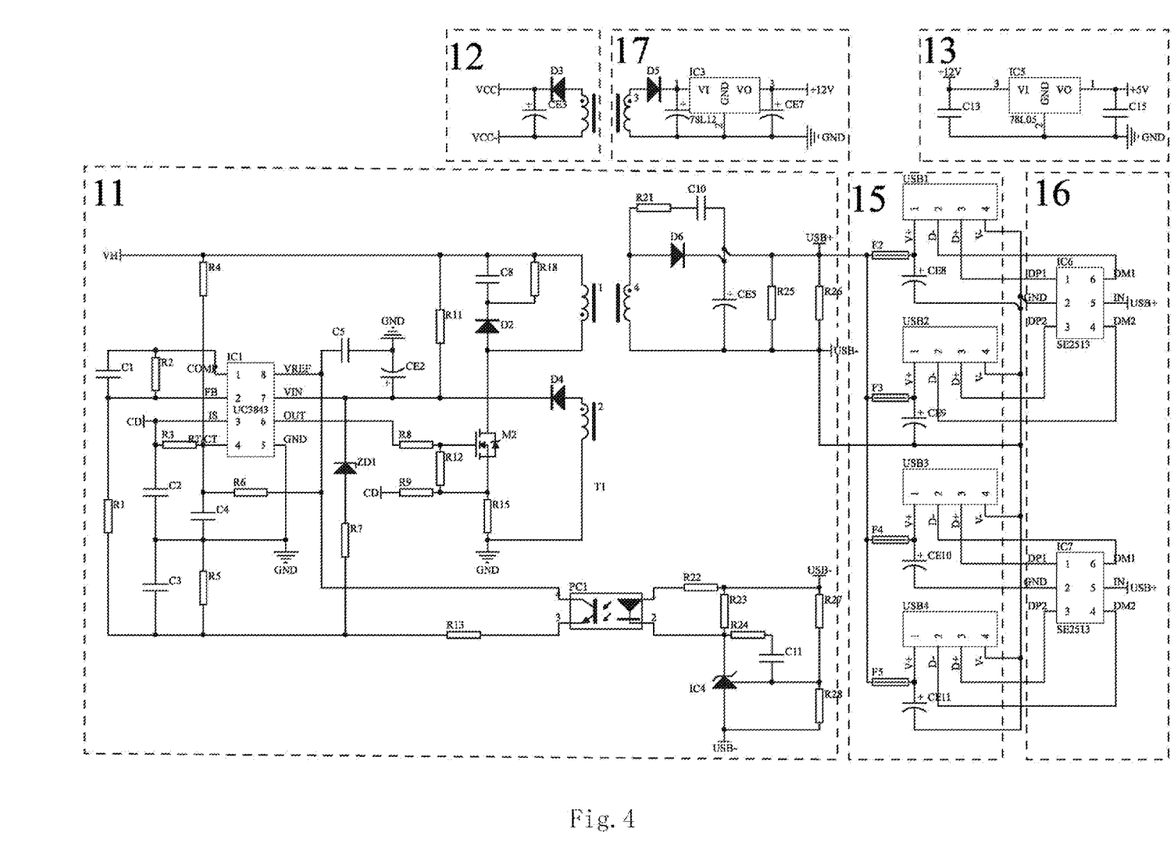
FIG. 4 is a circuit diagram of a specific embodiment of a flyback step-down circuit, a DC output and a DC output voltage control circuit of the alternating current step-down circuit of the present disclosure.

As a further improvement to the technical solution, with reference to FIGS. 2 and 4, FIG. 4 being a circuit diagram of a specific embodiment of the flyback step-down circuit, the DC output and a DC output voltage control circuit of the alternating current step-down circuit of the present disclosure, the flyback step-down circuit includes a PWM controller chip and a peripheral circuit. Specifically, the PWM controller chip IC1 is realized using a UC3843 PWM controller. In addition, in the present disclosure, the DC output is a USB output interface, for example USB1, USB2, USB3 and USB4 in FIG. 3. In actual use, the alternating current step-down circuit may provide electric energy to an external USB charging device via the USB output interface. Further, the alternating current step-down circuit further comprises a DC output voltage control circuit which is connected with the DC output. Specifically, the DC output voltage control circuit is implemented using a SE2513 USB dedicated charging port controller chip, for example IC6, IC7 in FIG. 4. It can identify the port voltage at the USB output interface and outputs intelligently a desired voltage signal value to the USB charging device connected with the USB output interface, thereby improving the intelligence of the alternating current step-down circuit.

Figure 5:
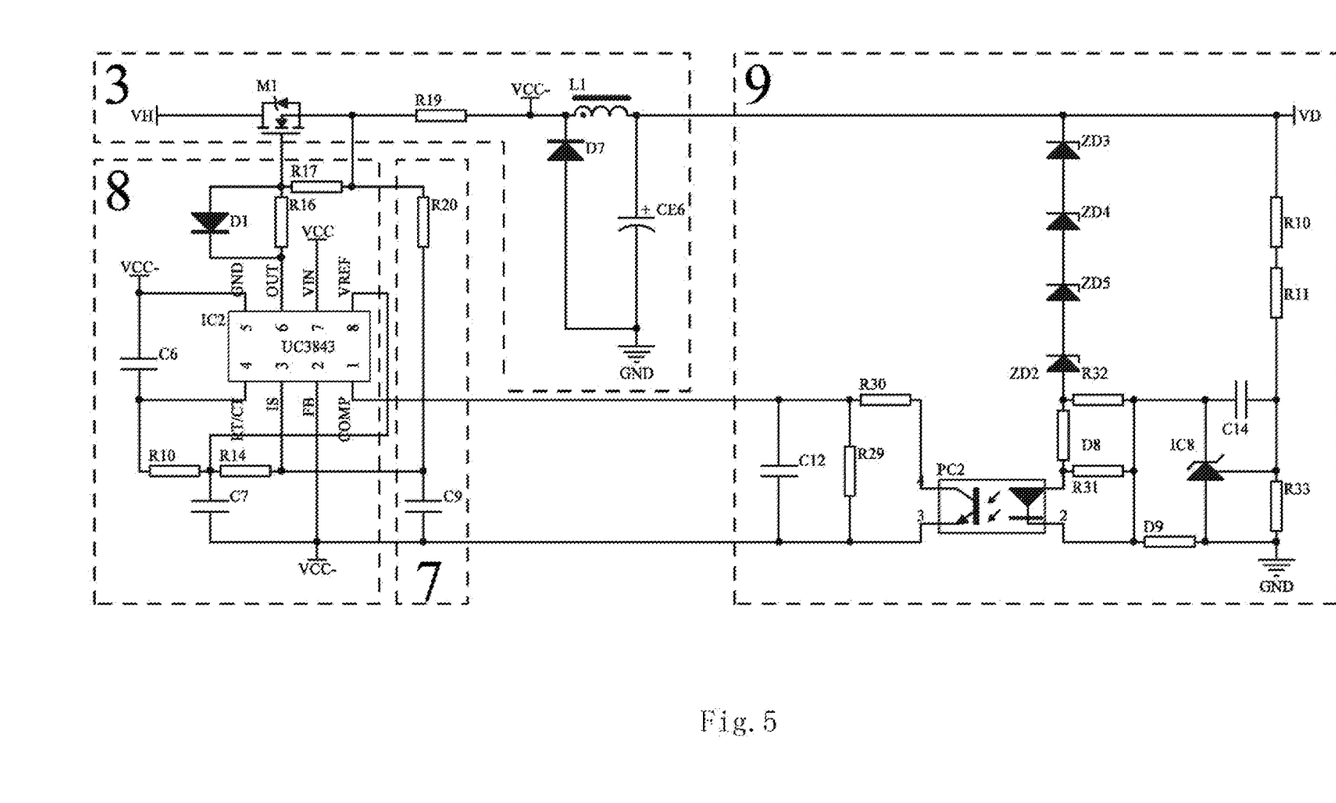
FIG. 5 is a circuit diagram of a specific embodiment of a first master control circuit, a current detection circuit, a DC-DC step-down circuit and a voltage feedback circuit of the alternating current step-down circuit of the present disclosure.

As a further improvement to the technical solution, with reference to FIG. 2, the DC-DC step-down unit comprises a first master control circuit, a DC-DC step-down circuit, a current detection circuit and a voltage feedback circuit. The output of the full-bridge rectification and filtering circuit is connected with an input of the DC-DC step-down circuit; the output of the flyback step-down circuit is connected with an input of the first master control circuit; an output of the DC-DC step-down circuit is connected with the input of the inverting unit, an input of the current detection circuit and an input of the voltage feedback circuit, respectively; an output of the current detection circuit and an output of the voltage feedback circuit are connected with the input of the first master control circuit; and an output of the first master control circuit is connected with the input of the DC-DC step-down circuit. With reference to FIGS. 4 and 5, FIG. 5 showing a circuit diagram of a specific embodiment of the first master control circuit, the current detection circuit, the DC-DC step-down circuit and the voltage feedback circuit of the alternating current step-down circuit of the present disclosure, the first master control circuit includes a PWM controller chip IC2 and a peripheral circuit. In this embodiment, the PWM controller chip IC2 is realized using a UC3843 PWM controller. The DC-DC step-down circuit includes a power switching tube M1, a power inductor L1, a filtering capacitor CE6 and a freewheeling diode D7. The current detection circuit uses resistor R19 as a current sampling resistor. A resistor R20 and a capacitor C9 form a RC integration circuit, and the first master control circuit acquires current signals on the current sampling resistor R19 cycle-by-cycle by means of the RC integration circuit. Resistors R10, R11, R33 are connected in series with positive and negative outputs of the DC-DC step-down circuit to form voltage sampling resistors. Voltage sampling signals are compared by a programmable precision reference three-terminal IC8 and fed back to the first master control circuit by an optocoupler PC2 to accomplish the voltage feedback. In this embodiment, the output of the flyback step-down circuit is connected with the input of the first master control circuit by a power supply circuit and is converted into an operating voltage applicable to the first master control circuit by the power supply circuit.

With reference to FIGS. 2, 3 and 5, the DC signal output by the full-bridge rectification and filtering circuit is converted into a low-voltage DC signal via the DC-DC step-down circuit. The current detection circuit acquires the current signal from the DC-DC step-down circuit and inputs it to the first master control circuit. The first master control circuit compares the acquired current signal with an internal high precision reference circuit to adjust the output PWM pulse width, and thus controls the DC-DC step-down circuit to output stable DC signals. Meanwhile, the voltage feedback circuit feeds the voltage signal from the DC-DC step-down circuit back to the first master control circuit which compares the voltage feedback signal with the internal high precision reference circuit to adjust the PWM pulse width and thus controls the DC-DC step-down circuit to output stable voltages.

As a further improvement to the technical solution, with reference to FIG. 2, the inverting unit comprises a current-voltage detection circuit, a second master control circuit, a DC-AC full-bridge switch circuit and a PWM control circuit. The output of the DC-DC step-down unit is connected with an input of the current-voltage detection circuit, that is, the output of the DC-DC step-down circuit is connected with the input of the current-voltage detection circuit. The output of the flyback step-down circuit is connected with an input of the second master control circuit. An output of the current-voltage detection circuit is connected with the input of the second master control circuit and an input of the DC-AC full-bridge switch circuit, respectively. An output of the second master control circuit is connected with an input of the PWM control circuit. An output of the PWM control circuit is connected with the input of the DC-AC full-bridge switch circuit. An output of the DC-AC full-bridge switch circuit is connected with the AC output.

Figure 6:
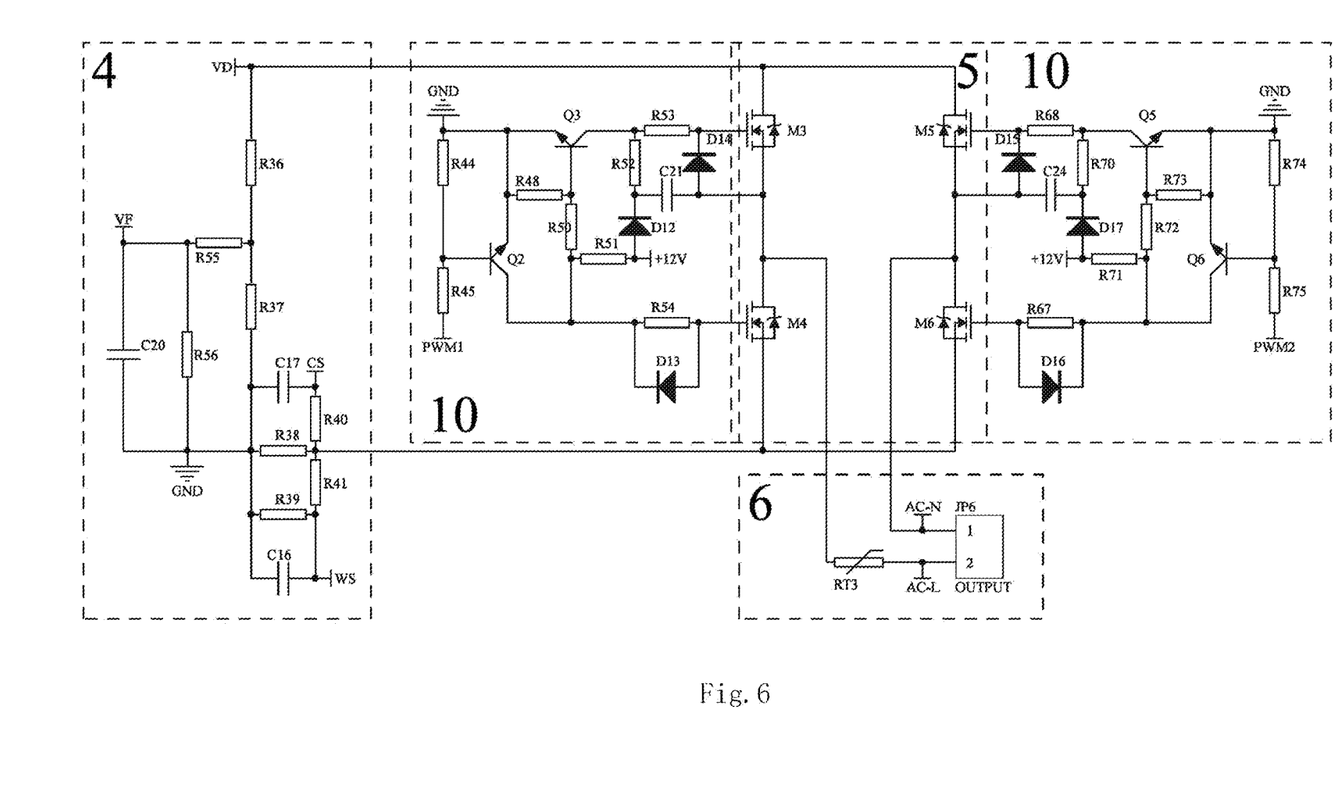
FIG. 6 is a circuit diagram of a specific embodiment of a current-voltage detection circuit, a PWM control circuit, a DC-AC full-bridge switch circuit and an AC output of the alternating current step-down circuit of the present disclosure.
Figure 7:
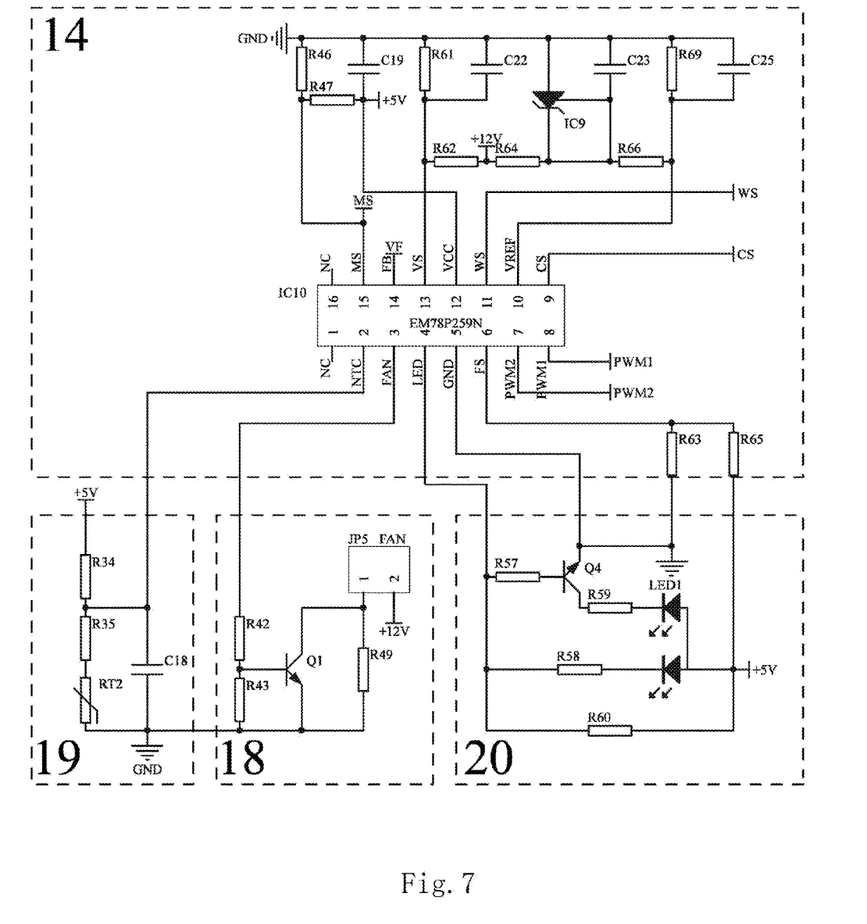
FIG. 7 is a circuit diagram of a specific embodiment of a second master control circuit, a fan circuit, a temperature detection circuit and an operative state indication circuit of the alternating current step-down circuit of the present disclosure.

With reference to FIGS. 2, 5, 6 and 7, FIG. 6 is a circuit diagram of a specific embodiment of the current-voltage detection circuit, the PWM control circuit, the DC-AC full-bridge switch circuit and the AC output of the alternating current step-down circuit; and FIG. 7 is a circuit diagram of a specific embodiment of the second master control circuit, a fan circuit, a temperature detection circuit and an operative state indication circuit of the alternating current step-down circuit of the present disclosure. In this embodiment, the AC output is further provided with a surge buffering circuit including a 10D-9 thermistor RT3, which may reduce the value of an instantaneous current input by the AC input, and protect devices connected with the alternating current step-down circuit from being damaged by large instantaneous currents. The output of the DC-DC step-down circuit is connected with the input of the current-voltage detection circuit. In the current-voltage detection circuit, resistors R36, R37, R55 and R56 are used as voltage detection resistors, capacitor C20 is a voltage detection filtering capacitor, and the detected output voltage signal from the DC-DC step-down circuit is transmitted to the second master control circuit by an output voltage signal sampling terminal VF. A resistor R40 and a capacitor C17 form a RC integration circuit, and the real-time current signal from a current sampling resistor R38 is converted into a voltage signal which is input into the second master control circuit by an output over-current signal sampling terminal CS. Resistors R39, R41 divide the voltage through a filtering capacitor C16, and the real-time current signal from the current sampling resistor R38 is converted into a voltage signal which is input into the second master control circuit through an output overload signal sampling terminal WS. The second master control circuit controls the operation of other circuits in the alternating current step-down circuit according to the voltage and current information detected by the current-voltage detection circuit.

With reference to FIGS. 2, 5, 6 and 7, the DC-AC full-bridge switch circuit includes power tubes M3, M4, M5 and M6. Drains of the power tubes M3 and M5 are connected to an output positive pole of the DC-DC step-down circuit. Sources of the power tubes M4 and M6 are connected to one end of the current sampling resistor R38, and the other end of the current sampling resistor R38 is connected to an output negative pole of the DC-DC step-down circuit. The second master control circuit controls the DC-AC full-bridge switch circuit by sending PWM1 and PWM2 signals. The source of the power tube M3 and the drain of the power tube M4 are connected and are connected to a live wire of the AC output via the thermistor RT1. The source of the power tube M5 and the drain of the power tube M6 are connected to a null line of the AC output.

With reference to FIGS. 2, 6 and 7, in the PWM control circuit, PWM1 and PWM2 signals are complimentary push-pull signals output by the second master control circuit, the PWM1 signal driving a triode Q2 through voltage division resistors R44 and R45. The triode Q2 controls a drive circuit for the power tubes M3 and M4 which operate in a push-pull mode. The drive voltage for the power tube M4 is supplied by a +12V via resistors R51 and R54. A diode D12 provides a discharge loop for accelerated turning-off of the power tube M4. The drive voltage for the power tube M3 is supplied by a first bootstrap circuit which comprises a resistor R52, a resistor R53, a discharge diode D14, a bootstrap diode D12 and a bootstrap capacitor C21. The PWM2 signal drives a triode Q6 through voltage division resistors R74 and R75. The triode Q6 controls a drive circuit for the power tubes M5 and M6 which operate in a push-pull mode. The drive voltage for the power tube M6 is supplied by a +12V via resistors R67 and R71. A diode D16 provides a discharge loop for accelerated turning-off of the power tube M6. The drive voltage for the power tube M5 is supplied by a second bootstrap circuit which comprises a resistor R68, a resistor R70, a discharge diode D15, a bootstrap diode D17 and a bootstrap capacitor C24. The resistors R48 and R50 are base voltage-division drive resistors of the triode Q3; and the resistors R72 and R73 are base voltage-division drive resistors of the triode Q5.

As a further improvement to the technical solution, with reference to FIG. 2, the alternating current step-down circuit further comprises the fan circuit, the output of the inverting unit being connected with an input of the fan circuit. The flyback step-down circuit provides an operating voltage for the fan circuit via a first three-terminal voltage stabilizing circuit. Further, the alternating current step-down circuit further comprises the temperature detection circuit and the operative state indication circuit, an output of the temperature detection circuit being connected with the input of the inverting unit, and the output of the inverting unit being connected with an input of the operative state indication circuit.

With reference to FIGS. 2, 4, 5, 6 and 7, the flyback step-down circuit is connected with and supplies power to the second master control circuit via a first three-terminal voltage stabilizing circuit and a second three-terminal voltage stabilizing circuit. The first three-terminal voltage stabilizing circuit includes a 78L12 three-terminal voltage stabilizing tube and a peripheral circuit; and the second three-terminal voltage stabilizing circuit includes a 78L05 three-terminal voltage stabilizing tube and a peripheral circuit. The second master control circuit is responsible for DC-AC signal conversion control and includes a single chip microcomputer and a peripheral circuit. In particular, the single chip microcomputer adopts an EM78P259N single chip microcomputer IC10. The peripheral circuit comprises an AC output voltage reference circuit, an AC output frequency reference circuit and an AC output overload short-circuit reference voltage circuit. The AC output voltage reference circuit comprises the resistors R55 and R56 through which an AC reference output voltage is set. The AC output frequency reference circuit comprises resistors R63 and R65, and an AC reference output frequency is set to 50 HZ/60 HZ. The AC output overload short-circuit reference voltage circuit comprises an resistor R64, a programmable precision reference three-terminal IC9, capacitors C23 and C25, and resistors R66 and R69. A reference voltage of 2.5V is output after the +12V passes through the resistor R64, the programmable precision reference three-terminal IC9 and the filtering capacitor C23, and is then divided by the resistors R66 and R69 and filtered by the capacitor C25 to obtain the AC output overload reference short-circuit voltage. After the single chip microcomputer is powered up, first of all the peripherally-setting reference circuits (i.e., the AC output voltage reference circuit, the AC output frequency reference circuit and the AC output overload short-circuit reference voltage circuit) are detected. Analog signals detected are converted into digital signals by an AD converter provided in the single chip microcomputer and are used as reference signals for DC-AC conversion control. Upon completion of self-check, the single chip microcomputer actively detects the analog signals acquired by the output voltage signal sampling terminal VF, the over-current signal sampling terminal CS and the output overload signal sampling terminal WS. The AD converter in the single chip microcomputer converts the analog signals into digital signals which are subjected to program operation and calculation to obtain stable AC output digital signals and AC output abnormality control digital signals. After that, the DA converter in the single chip microcomputer converts the digital signals into PWM analog signals and AC output abnormality processing signals to be output to the PWM control circuit and the operative state indication circuit.

With reference to FIGS. 2, 3, 4, 5, 6 and 7, in this embodiment, the operative state indication circuit is an LED indication circuit, for example LED1. In particular, the single chip microcomputer detects the voltage signal of the current-voltage detection circuit in real time and compares it with the AC output overload reference short-circuit voltage set by the peripheral circuit of the single chip microcomputer. If a voltage signal level detected by the over-current signal sampling terminal CS is higher than a reference voltage level, output over-current or output short circuit of the AC output can be determined, and the single chip microcomputer activates the short-circuit protection function and switches off the AC output by turning off the PWM control circuit; and if a voltage signal level detected by the output overload signal sampling terminal WS is higher than the reference voltage level, output overload of the AC output can be determined, and the single chip microcomputer activates the overload protection function and switches off the AC output by turning off the PWM control circuit. Meanwhile, the indication circuit makes corresponding indications. When the AC output is normal, the single chip microcomputer outputs a low level, and the LED displays green. When AC output overload or short circuit occurs, the single chip microcomputer counts the times of occurrence. If the number is less than two, then the current detection circuit, the DC-AC full-bridge switch circuit and the PWM control circuit are restarted; and if the number reaches two in succession, then the current detection circuit, the DC-AC full-bridge switch circuit and the PWM control circuit are turned off and will not be restarted, and only the power switch Si needs to be restarted. When there is no AC output, the single chip microcomputer outputs a high-level signal, and the LED displays red. In addition, the temperature detection circuit is realized using a NTC thermistor RT2. The single chip microcomputer detects analog signals in the temperature detection circuit and the AD converter in the single chip microcomputer converts the analog signals into digital signals which are compared with temperature digital signals already set in the temperature detection circuit so as to monitor the ambient temperature of the alternating current step-down circuit in real time. Finally, the fan circuit includes a fan and a peripheral circuit. When the single chip microcomputer compares the temperature digital signals detected by the temperature detection circuit in real time with the temperature digital signal already set in the temperature detection circuit and determines the ambient temperature of the alternating current step-down circuit to be higher than the set temperature, the single chip microcomputer outputs a high level and turns on the fan to reduce the temperature of the power supply. When the single chip microcomputer determines the ambient temperature of the alternating current step-down circuit to be lower than the set temperature, the single chip microcomputer outputs a low level and turns off the fan.

Preferred embodiments of the present disclosure have been described above, but the present disclosure is not limited thereto. Numerous variations, substitutions and equivalents may be made by those skilled in the art without departing from the spirit of the disclosure and should all fall within the scope defined by the claims of the present application.

The invention claimed is:
1. An alternating current step-down circuit, comprising:
an AC input,
a DC output,
an AC output,
a full-bridge rectification and filtering circuit,
a flyback step-down circuit,
a DC-DC step-down unit, and
an inverting unit,
wherein the AC input is connected with an input of the full-bridge rectification and filtering circuit; an output of the full-bridge rectification and filtering circuit is connected with an input of the flyback step-down circuit and with an input of the DC-DC step-down unit; an output of the flyback step-down circuit is connected with the DC output, with the input of the DC-DC step-down unit, and with an input of the inverting unit; an output of the DC-DC step-down unit is connected with the input of the inverting unit; and an output of the inverting unit is connected with the AC output;
wherein the inverting unit comprises:
a current-voltage detection circuit,
a master control circuit,
a DC-AC full-bridge switch circuit, and
a PWM control circuit,
wherein the output of the DC-DC step-down unit is connected with an input of the current-voltage detection circuit; the output of the flyback step-down circuit is connected with an input of the master control circuit; an output of the current-voltage detection circuit is connected with the input of the master control circuit and with an input of the DC-AC full-bridge switch circuit; an output of the master control circuit is connected with an input of the PWM control circuit; an output of the PWM control circuit is connected with the input of the DC-AC full-bridge switch circuit; and an output of the DC-AC full-bridge switch circuit is connected with the AC output.

2. The alternating current step-down circuit according to claim 1, further comprising a fan circuit, wherein an input of the fan circuit is connected with the output of the inverting unit.

3. The alternating current step-down circuit according to claim 1, further comprising a temperature detection circuit, wherein an output of the temperature detection circuit is connected with the input of the inverting unit.

4. The alternating current step-down circuit according to claim 1, further comprising an operative state indication circuit, wherein an input of the operative state indication unit is connected with the output of the inverting unit.

5. The alternating current step-down circuit according to claim 1, further comprising a DC output voltage control circuit that is connected with the DC output.

6. The alternating current step-down circuit according to claim 1, wherein the flyback step-down circuit comprises a pulse width modulation (PWM) controller chip and a peripheral circuit of the PWM controller chip.

7. An alternating current step-down circuit, comprising:
an AC input,
a DC output,
an AC output,
a full-bridge rectification and filtering circuit,
a flyback step-down circuit,
a DC-DC step-down unit, and
an inverting unit,
wherein the AC input is connected with an input of the full-bridge rectification and filtering circuit; an output of the full-bridge rectification and filtering circuit is connected with an input of the flyback step-down circuit and with an input of the DC-DC step-down unit; an output of the flyback step-down circuit is connected with the DC output, with the input of the DC-DC step-down unit, and with an input of the inverting unit; an output of the DC-DC step-down unit is connected with the input of the inverting unit; and an output of the inverting unit is connected with the AC output; and
wherein the DC-DC step-down unit comprises:
a first master control circuit,
a DC-DC step-down circuit,
a current detection circuit, and
a voltage feedback circuit,
wherein the output of the full-bridge rectification and filtering circuit is connected with an input of the DC-DC step-down circuit; the output of the fly-back step-down circuit is connected with an input of the first master control circuit; an output of the DC-DC step-down circuit is connected with the input of the inverting unit, with an input of the current detection circuit, and with an input of the voltage feedback circuit; an output of the current detection circuit and an output of the voltage feedback circuit are connected with the input of the first master control circuit; and an output of the first master control circuit is connected with the input of the DC-DC step-down circuit:
wherein the inverting unit comprises:
a current-voltage detection circuit,
a second master control circuit,
a DC-AC full-bridge switch circuit, and
a PWM control circuit,
wherein the output of the DC-DC step-down unit is connected with an input of the current-voltage detection circuit; the output of the flyback step-down circuit is connected with an input of the second master control circuit; an output of the current-voltage detection circuit is connected with the input of the second master control circuit and with an input of the DC-AC full-bridge switch circuit; an output of the second master control circuit is connected with an input of the PWM control circuit; an output of the PWM control circuit is connected with the input of the DC-AC full-bridge switch circuit; and an output of the DC-AC full-bridge switch circuit is connected with the AC output.

8. The alternating current step-down circuit according to claim 7, further comprising a fan circuit, wherein an input of the fan circuit is connected with the output of the inverting unit.

9. The alternating current step-down circuit according to claim 7, further comprising a temperature detection circuit, wherein an output of the temperature detection circuit is connected with the input of the inverting unit.

10. The alternating current step-down circuit according to claim 7, further comprising an operative state indication circuit, wherein an input of the operative state indication circuit is connected with the output of the inverting unit.

11. The alternating current step-down circuit according to claim 7, further comprising a DC output voltage control circuit that is connected with the DC output.

12. The alternating current step-down circuit according to claim 7, wherein the first master control circuit comprises a pulse width modulation (PWM) controller chip and a peripheral circuit of the PWM controller chip.

13. The alternating current step-down circuit according to claim 1, wherein the master control circuit comprises a single chip microcomputer and a peripheral circuit of the single chip microcomputer.

14. The alternating current step-down circuit according to claim 8, wherein the second master control circuit comprises a single chip microcomputer and a peripheral circuit of the single chip microcomputer.

* * * * *